United States Patent
Jones et al.

(10) Patent No.: US 10,584,612 B2
(45) Date of Patent: Mar. 10, 2020

(54) VENTILATED BUSH

(71) Applicant: ROLLS-ROYCE plc, London (GB)

(72) Inventors: Oliver Jones, Nottingham (GB); Miles Hawkyard, Derby (GB); Adrian R. M. Walker, Derby (GB)

(73) Assignee: Rolls-Royce plc, London (GB)

(*) Notice: Subject to any disclaimer, the term of this patent is extended or adjusted under 35 U.S.C. 154(b) by 46 days.

(21) Appl. No.: 16/100,251

(22) Filed: Aug. 10, 2018

(65) Prior Publication Data
US 2019/0072000 A1 Mar. 7, 2019

(30) Foreign Application Priority Data
Sep. 7, 2017 (GB) .................................. 1714373.6

(51) Int. Cl.
| F01D 25/24 | (2006.01) |
| F04D 29/64 | (2006.01) |
| F16B 5/02 | (2006.01) |
| F04D 29/52 | (2006.01) |

(52) U.S. Cl.
CPC ........... *F01D 25/243* (2013.01); *F01D 25/24* (2013.01); *F04D 29/522* (2013.01); *F04D 29/64* (2013.01); *F04D 29/644* (2013.01); *F16B 5/02* (2013.01); *F05D 2220/32* (2013.01); *F05D 2240/14* (2013.01); *F05D 2260/30* (2013.01); *F05D 2260/31* (2013.01); *F05D 2260/602* (2013.01); *F05D 2260/95* (2013.01)

(58) Field of Classification Search
CPC .......... F01D 25/24; F01D 25/243; F16B 5/02; F04D 29/644; F05D 2220/32; F05D 2240/14; F05D 2260/30; F05D 2260/31; F05D 2260/602; F05D 2260/95
See application file for complete search history.

(56) References Cited

U.S. PATENT DOCUMENTS

| 8,475,102 B2 * | 7/2013 | Haylock ................ B64D 45/02 411/361 |
| 2003/0108403 A1 * | 6/2003 | Scoyoc ................. F16B 35/041 411/421 |
| 2016/0245308 A1 * | 8/2016 | Robertson ............... F01D 9/042 |
| 2016/0297542 A1 * | 10/2016 | Khosravani ............ B64D 45/02 |

FOREIGN PATENT DOCUMENTS

EP 3078597 10/2016

OTHER PUBLICATIONS

Great Britain Search Report dated Feb. 12, 2018, issued in GB Patent Application No. 1714373.6.

* cited by examiner

*Primary Examiner* — Igor Kershteyn
(74) *Attorney, Agent, or Firm* — Simpson & Simpson, PLLC

(57) ABSTRACT

A bush having a neck portion (33) for inserting into an aperture of one or both of two components to be fastened together, a radially extending shoulder portion (34) having a rear face (34a) adjacent the neck portion (33) an opposite front face (34b) and a radially outer face (34c) extending between the rear face (34a) and the front face (34b), one or more ventilation slots (36) provided in the rear face extending from a junction between the rear face (34a) and the neck portion (33) whereby, in use, to provide an escape route for air caught between the bush and a component.

12 Claims, 4 Drawing Sheets

Section A-A

FIG. 6
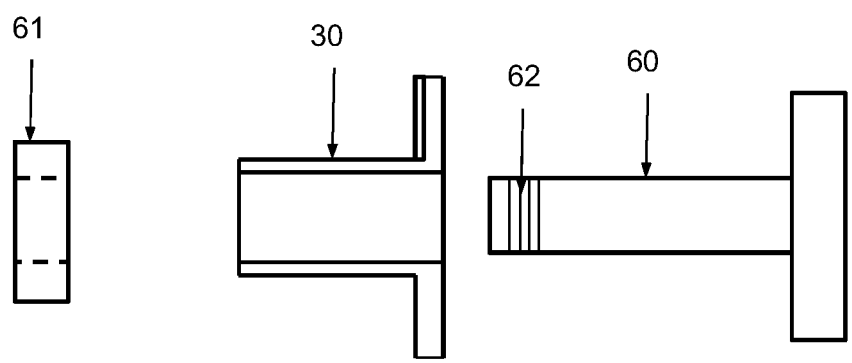
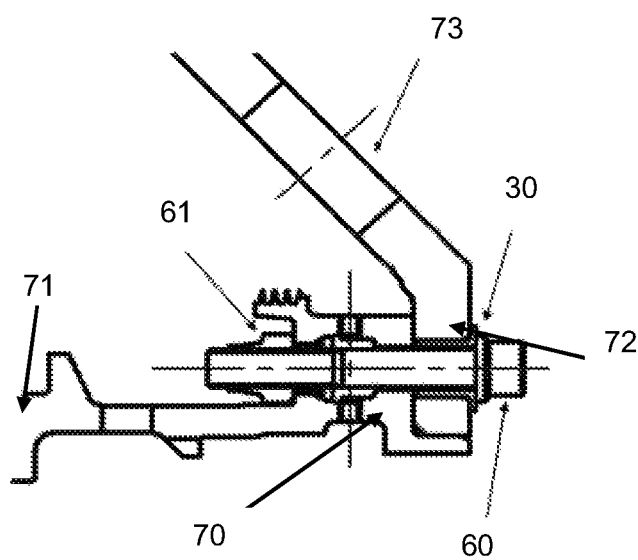
FIG. 7

VENTILATED BUSH

CROSS-REFERENCE TO RELATED APPLICATIONS

This application is based upon and claims the benefit of priority from British Patent Application No. GB 1714373.6, filed on 7 Sep. 2017, the entire contents of which are incorporated by reference.

BACKGROUND

Technical Field

The present disclosure relates to fastener assemblies, more particularly fastener assemblies used for fastening together components for use in a high pressure environment.

Description of the Related Art

FIG. 1 shows a gas turbine engine generally indicated at 10, having a principal and rotational axis 11. The engine 10 comprises, in axial flow series, an air intake 12, a propulsive fan 13, a high-pressure compressor 14, combustion equipment 15, a high-pressure turbine 16, a low-pressure turbine 17 and an exhaust nozzle 18. A nacelle 20 generally surrounds the engine 10 and defines the intake 12.

The gas turbine engine 10 works in the conventional manner so that air entering the intake 12 is accelerated by the fan 13 to produce two air flows: a first air flow into the high-pressure compressor 14 and a second air flow which passes through a bypass duct 21 to provide propulsive thrust. The high-pressure compressor 14 compresses the air flow directed into it before delivering that air to the combustion equipment 15.

In the combustion equipment 15 the air flow is mixed with fuel and the mixture combusted. The resultant hot combustion products then expand through, and thereby drive the high and low-pressure turbines 16, 17 before being exhausted through the nozzle 18 to provide additional propulsive thrust. The high 16 and low 17 pressure turbines drive respectively the high pressure compressor 14 and the fan 13, each by a suitable interconnecting shaft.

Along the engine axis, segments of the engine core are held in position by a number of fastener assemblies, for example bushes, nuts and bolts passing through flanges of adjacent core components. Such fastener assemblies may for example (but without limitation) secure a compressor stage to a support frame. In such fastening arrangements pockets of air can be trapped in the fastened assembly. When in use, these assemblies can be subjected to extreme pressures and temperatures in the surrounding environment. This locally trapped air creates a micro environment of relatively low air pressure within which stress corrosion cracks can be generated and allowed to propagate. This can result in unacceptable damage to the assembly necessitating repair or replacement of components.

SUMMARY

The present disclosure provides a bush having a neck portion for inserting into an aperture of one or both of two components to be fastened together, a radially extending shoulder portion having a rear face adjacent the neck portion an opposite front face and a radially outer face extending between the rear face and the front face, one or more ventilation slots provided in the rear face extending from a junction between the rear face and the neck portion whereby, in use, to provide an escape route for air caught between the bush and a component.

For example, the ventilation slots may comprise grooves in the rear face which extend across the rear face to the radially outer face. In an alternative, the ventilation slots may comprise channels extending from the rear face through the shoulder portion to the front face. In another alternative, the ventilation slots comprise a channels extending from the rear face through the shoulder portion and exiting at the radially outer face.

The ventilation slots may be multiple and radially equally spaced around the neck portion. For example, there are three radially equally spaced ventilation slots. The slots may be of even dimensions.

The bush may comprise part of a fastener assembly which includes a bolt proportioned to be received in an aperture passing from the front face through the neck portion of the bush emerging at an end of the neck portion, and a nut for threading onto the emerging bolt.

The bush may be a threaded bush. The thread may be on an inner surface of the neck portion. The thread may be on an outer surface of the neck portion.

The ventilation slots may be machined into the bush after manufacture of a standard bush. The ventilation slots may be built into the bush using an additive manufacturing method. The ventilation slots may be cut into the bush using laser or EDM machining or the like.

For example, one of the two components is a flange of a compressor stage in a gas turbine engine. The flange may be of a high pressure compressor stage of the gas turbine engine. One of the two components may be a Curvic® coupling or other coupling extending from a casing of a gas turbine engine.

DESCRIPTION OF THE DRAWINGS

Embodiments of the present disclosure will now be described with reference to the accompanying Figures in which;

FIG. 6 shows a fastener assembly comprising a bush in accordance with the present disclosure; and FIG. 7 shows the fastener assembly of FIG. 5 in place fastening components of a gas turbine engine.

DETAILED DESCRIPTION

Figure 1:
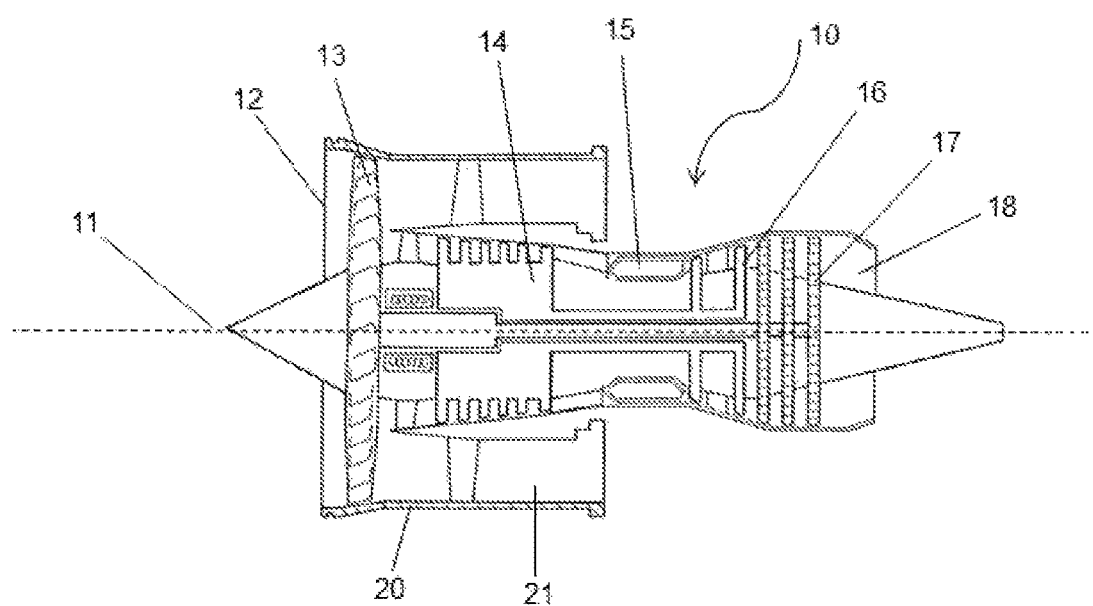
FIG. 1 is a sectional side view of a gas turbine engine.

FIG. 1 is described in detail above.

Figure 2:
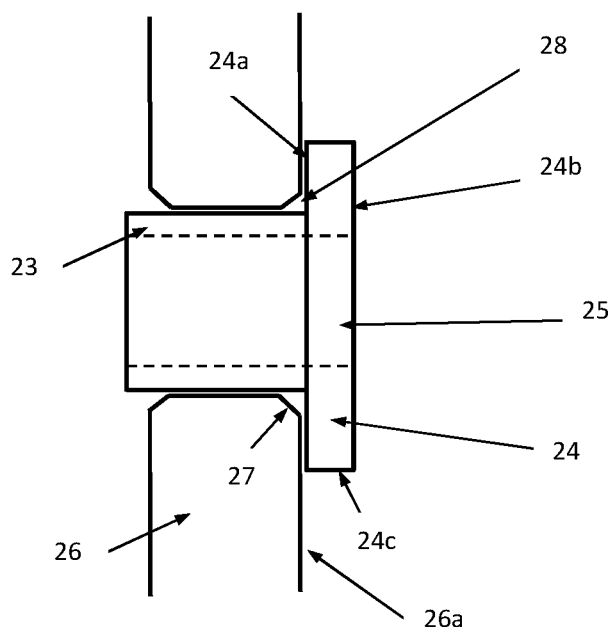
FIG. 2 shows a prior bush forming part of a fastener assembly.

As can be seen in FIG. 2 a conventional bush comprises a neck portion 23 and a shoulder portion 24 extending radially outwardly from an end of the neck portion 23. The shoulder portion 24 has a solid body defined by a rear face 24a, a front face 24b and a radially outer face 24c. An aperture 25 (represented by the broken lines) extends axially though a centre of the shoulder portion 24 and the neck portion 23. The bush is located by an interference fit in an aperture of a component 26. The component has a mating face 26a which faces the rear face 24a of the shoulder portion 24. When fully inserted into the component, the bush traps a pocket of air 28 between a chamfered surface of the component 26, the neck portion 23 and the rear face 24a. Assembly is typically done a standard room temperature and pressures. The component is intended for use in a gas turbine engine. In the working engine, air pressure surrounding the assembly is significantly increased compared to the pressure of the trapped air 28. Since the walls 24a, 23, 27 enclosing the gap 28 are substantially air tight, the pressure in the gap remains significantly lower than that of the surrounding air. This can result in cracking of the component 26 in the vicinity of gap 28. If the cracks propagate, this can result in fractures in this vicinity which can result in loosening of the fastener and/or potential failure of the component 26.

Figure 3:
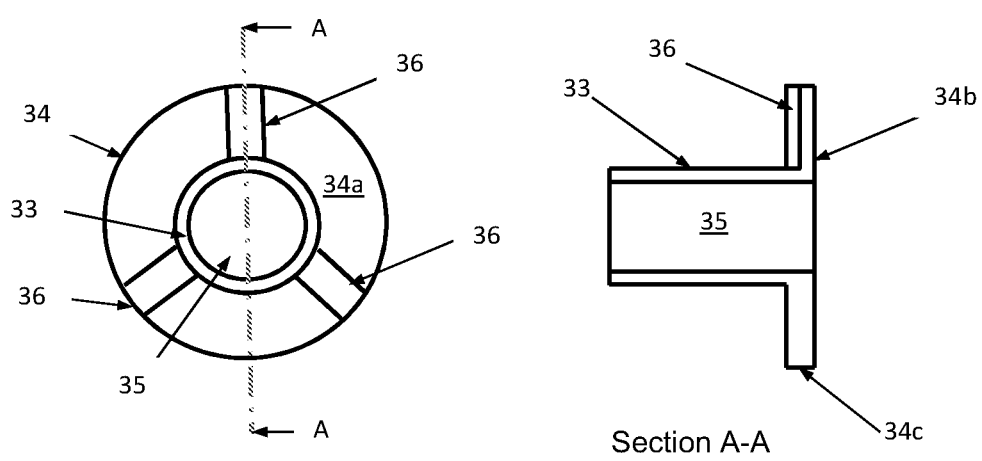
FIG. 3 is a first embodiment of a bush in accordance with the present disclosure.

FIG. 3 shows a first embodiment of a bush in accordance with the present disclosure. In common with a conventional bush, the bush has a neck portion 33 and a shoulder portion 34 having a rear face 34a. A central bore 35 passes axially through the centres of the shoulder portion 34 and neck portion 33. In contrast to the prior art bush of FIG. 2, the bush has three grooves 36 provided in the rear face 34a. Each of the slots extends from a radially outer surface of the shoulder portion 34 to a junction where the neck portion 33 meets the shoulder portion 34. In use, any air trapped between the shoulder portion rear face 34a and a mating face of a component to be fastened is enabled to escape through the slots 36. Thus, when the bush and component are placed in an operating environment with an increased pressure, the pressure of air between the bush rear face 34a and the mating face can be equalised with the pressure of the surrounding air.

Figure 4:
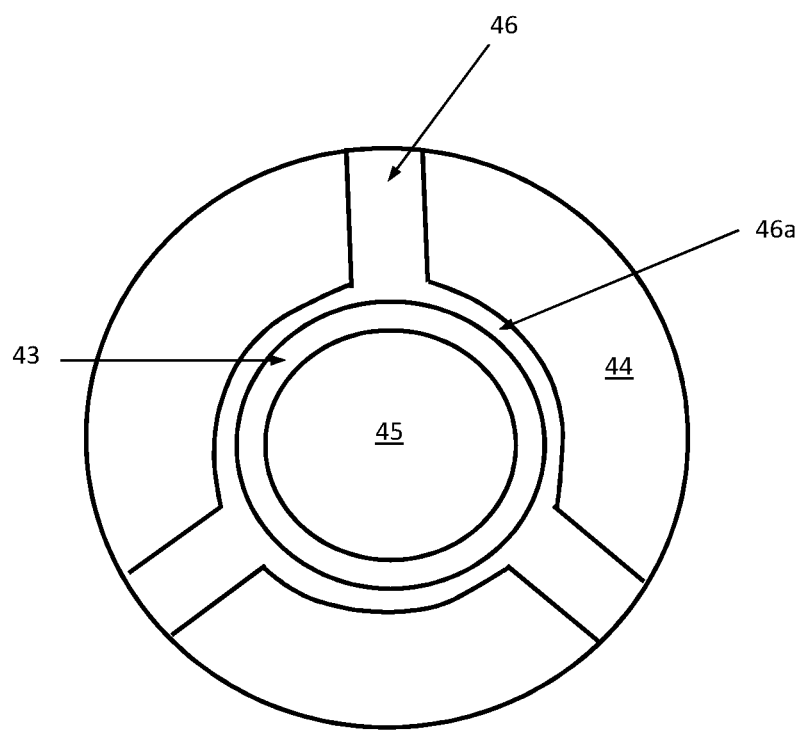
FIG. 4 is a second embodiment of a bush in accordance with the present disclosure.

FIG. 4 shows an alternative embodiment of a bush in accordance with the present disclosure. The bush has many features in common with the bush of FIG. 3 and comprises a neck portion 43 and a shoulder portion 44 and a central aperture 45. Three circumferentially spaced slots 46 extend radially across the shoulder portion 44 from the neck portion 43. In the shown embodiment, the bush also includes an annular channel connecting each of the slots 46. The annular channel encircles the neck portion 46.

Figure 5:
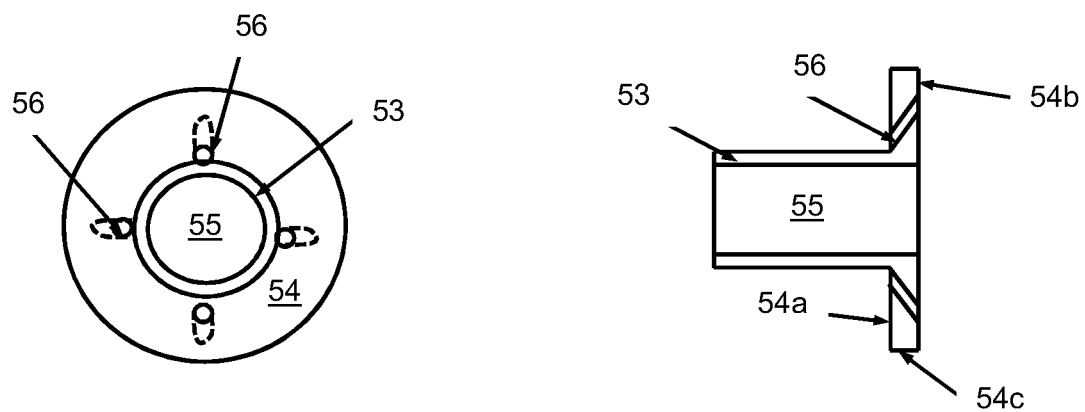
FIG. 5 is a third embodiment of a bush in accordance with the present disclosure.

FIG. 5 shows another alternative embodiment of a bush in accordance with the present disclosure. The bush has many features in common with the bush of FIGS. 3 and 4 and comprises a neck portion 53 and a shoulder portion 54 and a central aperture 55. An array of holes 56 extend from an rear face 54a of the shoulder portion 54 axially and radially through the shoulder portion 54 and emerge at the front face 54b of the shoulder portion. In an alternative arrangement the holes 56 may exit the shoulder portion 54 at a radially outer surface.

FIG. 6 shows the bush 30 of FIG. 3 as part of an assembly including a bolt 60 and a nut 61 for screwing onto a screw thread 62 of the bolt 60.

FIG. 7 shows a flange 70 of a compressor drum 71 of a gas turbine engine such as that shown in FIG. 1. The compressor flange 70 is aligned with a curvic flange 72 of a Curvic® coupling 73. The bush 30 is located snugly in an aperture of the curvic flange 72. The aperture is aligned with a second aperture in the compressor flange 70. The bolt 60 is received through the bush 30, extends through the second aperture and extends sufficiently to allow the nut 61 to be located on a threaded end of the bolt 60.

Other gas turbine engines to which the present disclosure may be applied may have alternative configurations. By way of example such engines may have an alternative number of interconnecting shafts (e.g. three) and/or an alternative number of compressors and/or turbines. Further the engine may comprise a gearbox provided in the drive train from a turbine to a compressor and/or fan.

It will be understood that the invention is not limited to the embodiments above-described and various modifications and improvements can be made without departing from the concepts defined by the appended claims. Except where mutually exclusive, any of the features may be employed separately or in combination with any other features and the disclosure extends to and includes all combinations and sub-combinations of one or more features described herein.

The invention claimed is:

1. A bush having a neck portion for inserting into an aperture of one or both of two components to be fastened together, a radially extending shoulder portion having a rear face adjacent the neck portion an opposite front face and a radially outer face extending between the rear face and the front face, one or more ventilation slots provided in the rear face extending from a junction between the rear face and the neck portion whereby, in use, to provide an escape route for air caught between the bush and a component.

2. A bush as claimed in claim 1 wherein the ventilation slots comprise grooves in the rear face which extend across the rear face to the radially outer face.

3. A bush as claimed in claim 1 wherein the ventilation slots comprise channels extending from the rear face through the shoulder portion to the front face.

4. A bush as claimed in claim 1 wherein the ventilation slots comprise channels extending from the rear face through the shoulder portion and exiting at the radially outer face.

5. A bush as claimed in claim 1 comprising multiple ventilation slots which are radially equally spaced around the neck portion.

6. A bush as claimed in claim 5 comprising three radially equally spaced ventilation slots.

7. A bush as claimed in claim 1 wherein the bush has a threaded bore.

8. A fastener assembly comprising a bush as claimed in claim 1 and further including a bolt proportioned to be received in an aperture passing from the front face through the neck portion of the bush emerging from an end of the neck portion, and a nut for threading onto the emerging bolt.

9. A fastener assembly as claimed in claim 8 arranged to fasten a compressor flange of a compressor stage to a support structure in a gas turbine engine.

10. A fastener assembly as claimed in claim 9 wherein the compressor stage is a high pressure compressor stage.

11. A fastener assembly as claimed in claim 9 wherein the support structure comprises a Curvic® coupling.

12. A gas turbine engine comprising a segmented core wherein one or more of the core segments is connected to a support structure by means of a fastener assembly as claimed in claim 8.

* * * * *